(12) United States Patent
Ma et al.

(10) Patent No.: US 8,081,435 B2
(45) Date of Patent: Dec. 20, 2011

(54) ELECTRONIC DEVICE WITH PULL-OUT DISPLAY

(75) Inventors: Xian-Wei Ma, Shenzhen (CN); Ting Luo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/871,846

(22) Filed: Aug. 30, 2010

(65) Prior Publication Data
US 2011/0222232 A1 Sep. 15, 2011

(30) Foreign Application Priority Data
Mar. 12, 2010 (CN) .......................... 2010 1 0123321

(51) Int. Cl.
*H05K 5/00* (2006.01)
*H05K 7/00* (2006.01)
(52) U.S. Cl. ......... 361/679.21; 361/679.26; 361/679.27; 361/679.3; 361/679.55; 361/679.56
(58) Field of Classification Search ............. 361/679.21, 361/679.26, 679.27, 679.3, 679.55, 679.56
See application file for complete search history.

(56) References Cited

U.S. PATENT DOCUMENTS

| | | | | |
|---|---|---|---|---|
| 5,548,478 A * | 8/1996 | Kumar et al. | ............ | 361/679.27 |
| 7,196,692 B2 * | 3/2007 | Mochizuki et al. | ........... | 345/168 |
| 7,443,657 B2 * | 10/2008 | Gitzinger et al. | ........ | 361/679.27 |
| 7,611,113 B2 * | 11/2009 | Lai | ............................. | 248/286.1 |
| 7,639,479 B2 * | 12/2009 | Chuang et al. | ........... | 361/679.06 |

* cited by examiner

*Primary Examiner* — Anthony Haughton
(74) *Attorney, Agent, or Firm* — Altis Law Group, Inc.

(57) ABSTRACT

An electronic device is provided. The electronic device includes a display, a sliding member, and a main body. The display includes two connecting members. The sliding member is rotatably connected to the connecting member. The main body includes a housing, a first casing, and a second casing. The housing defines two slots. Each slot extends through the housing. The first casing is secured to the housing. The first casing and the housing cooperatively define a first receiving space communicating with the slots. The sliding member is slidably received in the first receiving space. The second casing is secured to the housing. The second casing and the housing cooperatively define a second receiving space to receive the display. The second receiving space communicates with the first receiving space and defines an opening. The display is pushed into and out of the second receiving space from the opening.

6 Claims, 7 Drawing Sheets

ELECTRONIC DEVICE WITH PULL-OUT DISPLAY

BACKGROUND

1. Technical Field

The present disclosure relates to electronic devices and, particularly, to an electronic device having a display that can be optionally stored in a compartment of the device while the device is in use or pulled out from the compartment.

2. Description of Related Art

It is not uncommon for people project content of their notebook computers onto a suitable display in conferences, meetings, etc. In such circumstances, the display of the computer not being needed yet is left exposed and at risk of accidental damage.

BRIEF DESCRIPTION OF THE DRAWINGS

The components in the drawings are not necessarily drawn to scale, the emphasis instead being placed upon clearly illustrating the principles of an electronic device with a pull-out display. Moreover, in the drawings, like reference numerals designate corresponding parts throughout the several views.

DETAILED DESCRIPTION

Figure 1:
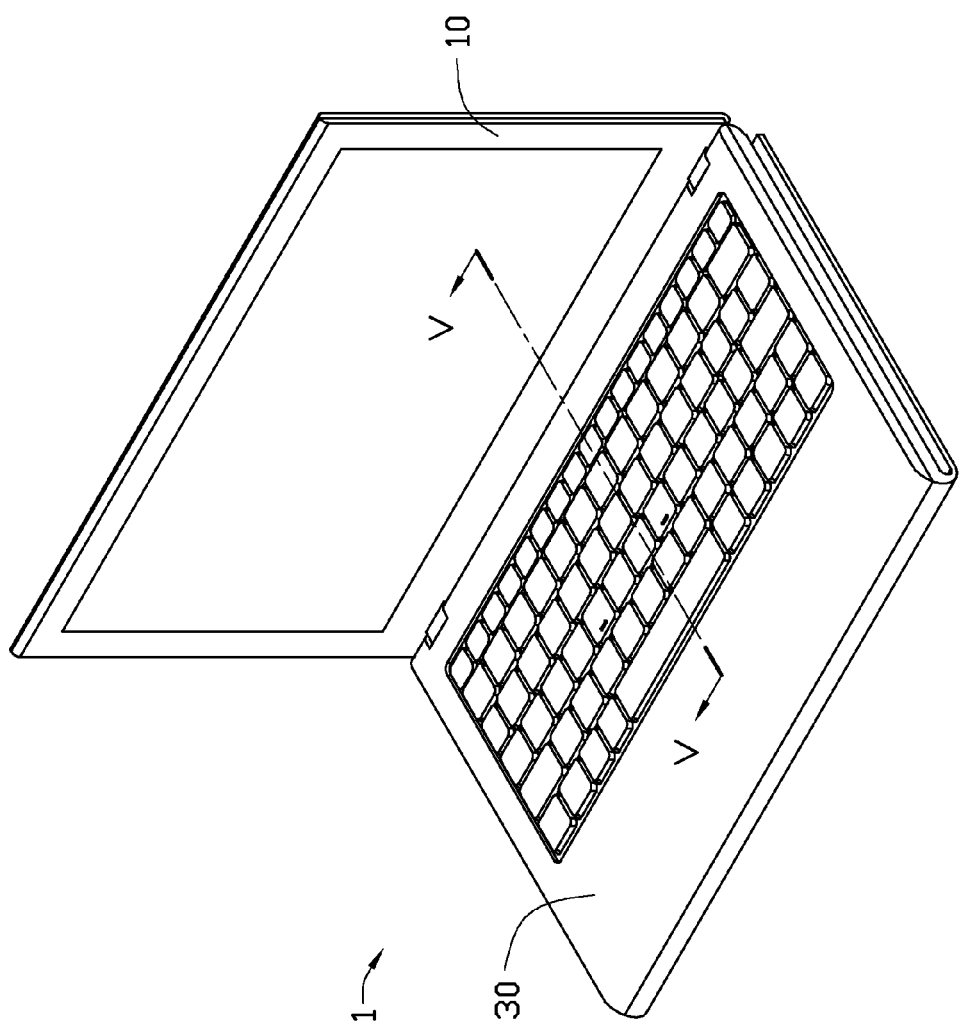
FIG. 1 is an isometric view of an electronic device in accordance with an exemplary embodiment, showing the electronic device in an open state with a display positioned for viewing.
Figure 2:
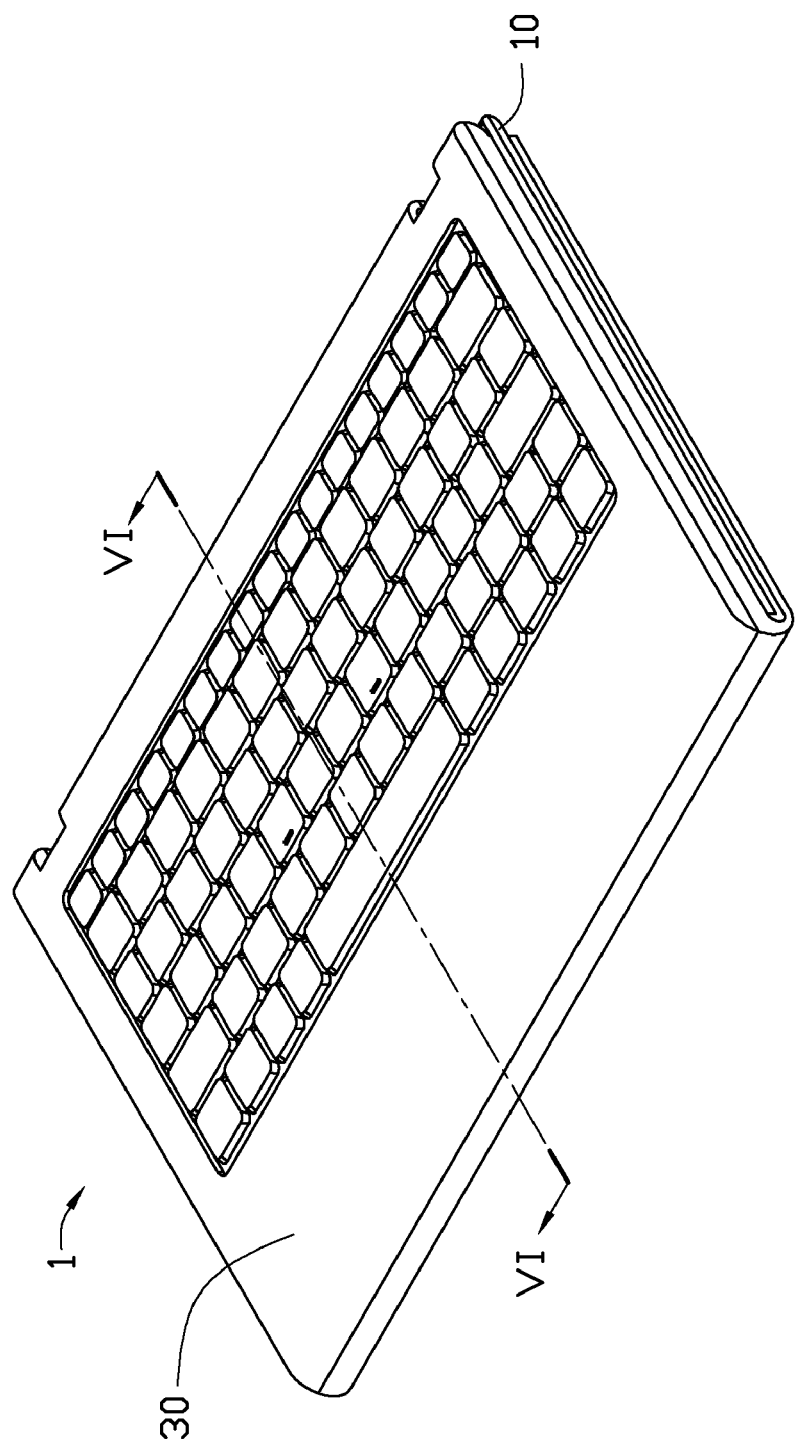
FIG. 2 is another isometric view of the electronic device of FIG. 1, showing the electronic device in an open state but with the display stowed in a compartment.
Figure 3:
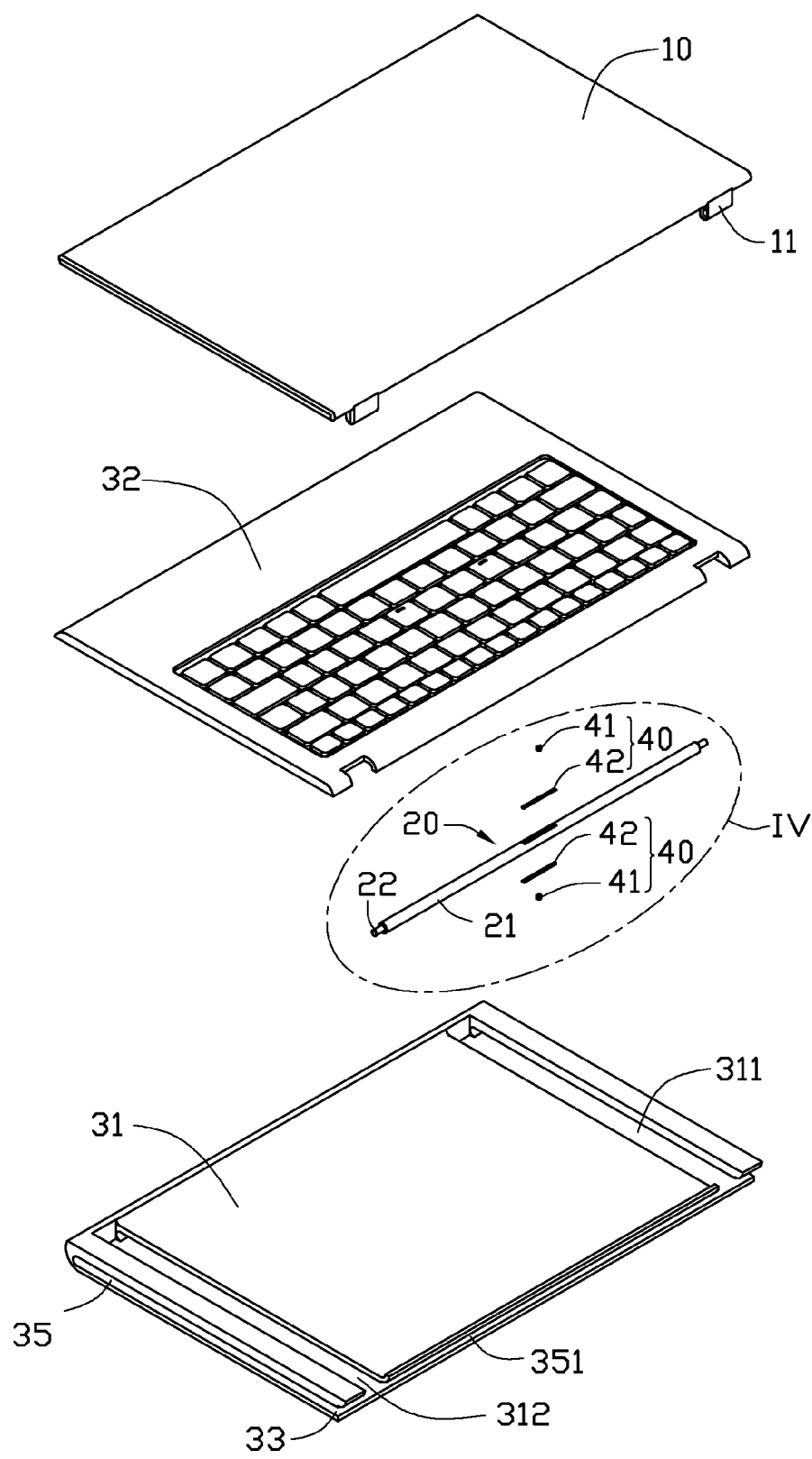
FIG. 3 is an exploded view of the electronic device of FIG. 1.
Figure 4:
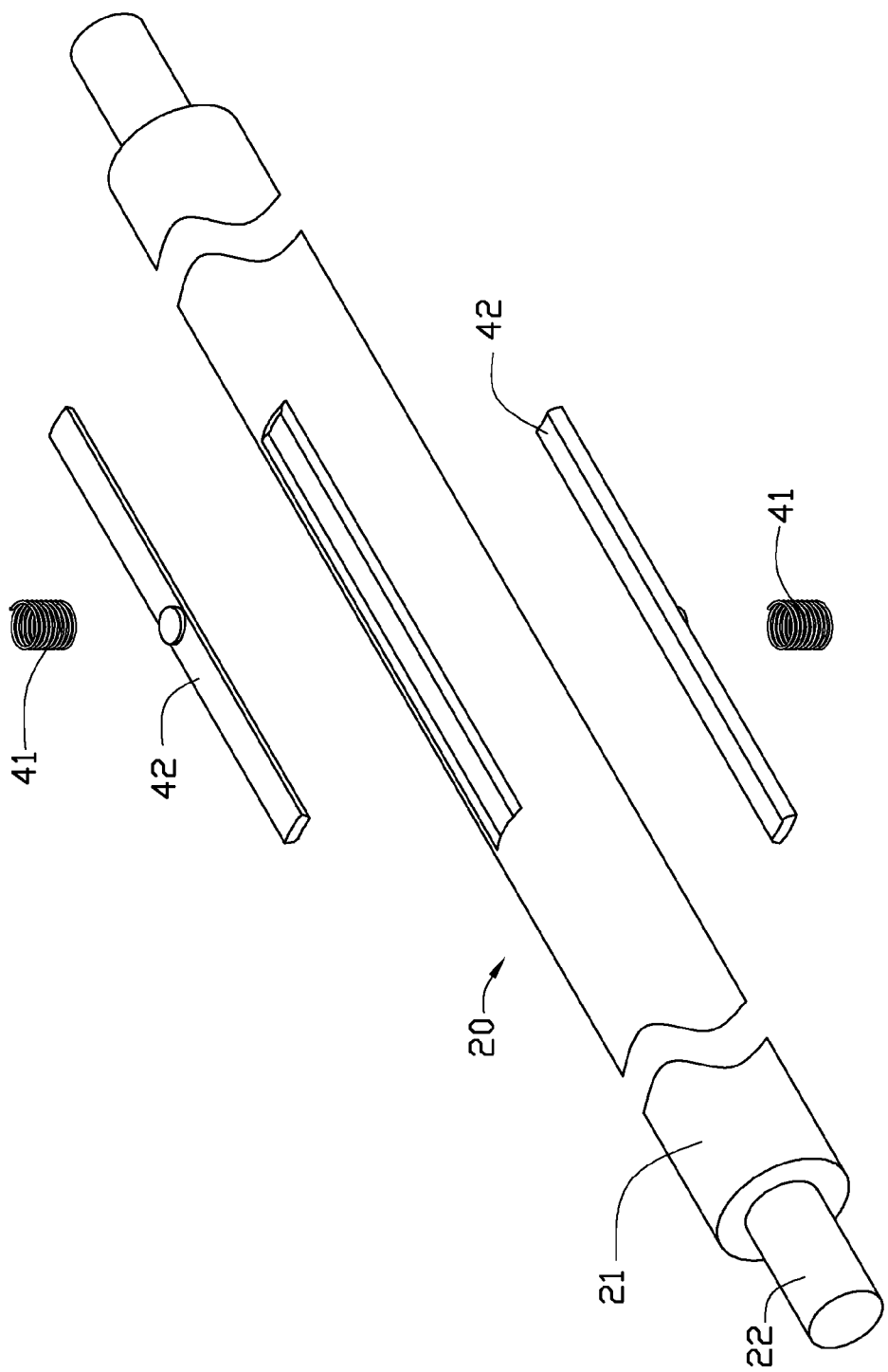
FIG. 4 is a partially enlarged view of the portion IV of FIG. 3.
Figure 5:
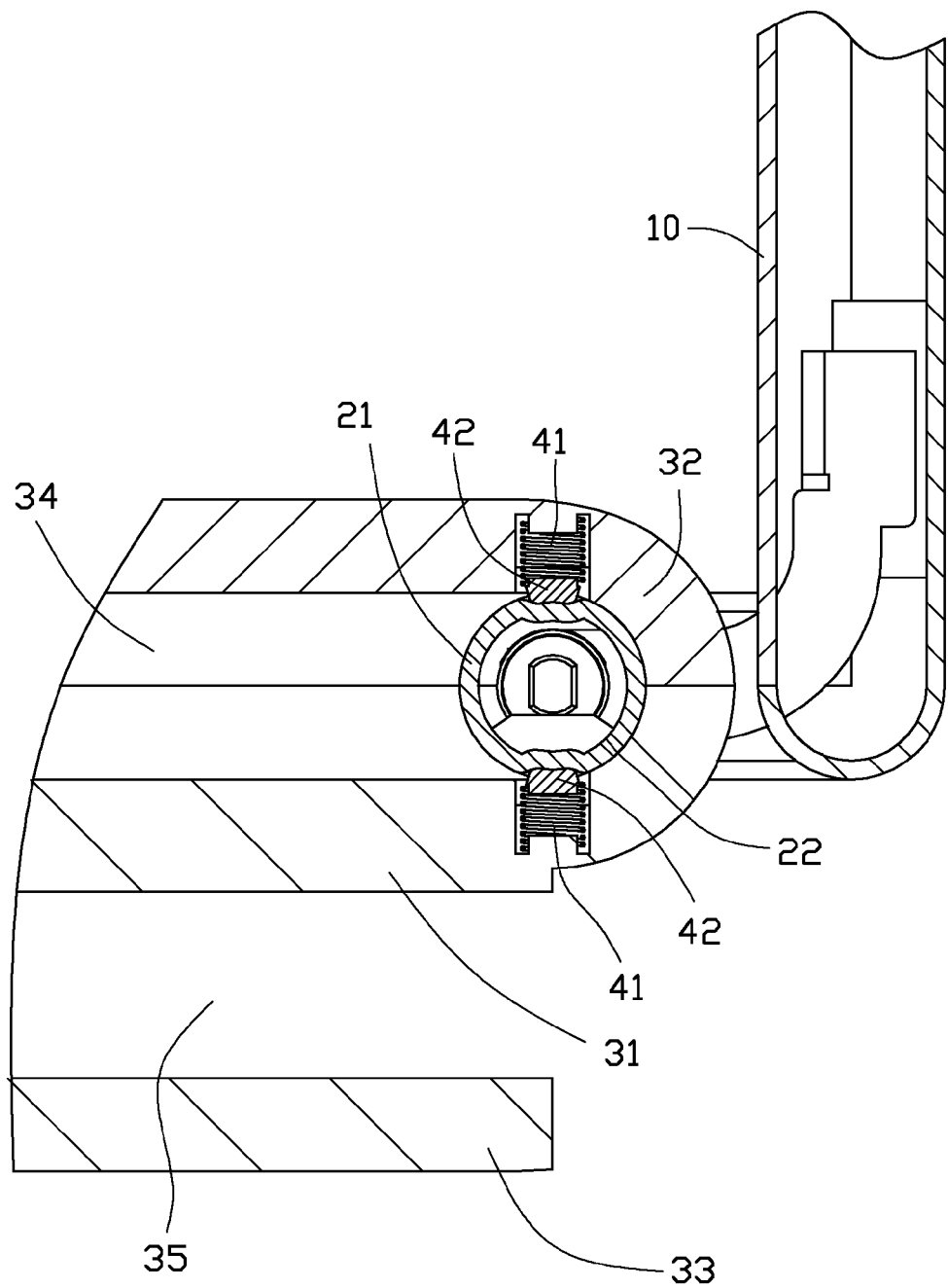
FIG. 5 is a partial, cross-sectional view of the electronic device of FIG. 1, taken along line V-V.

Referring to FIGS. 1-5, an electronic device 1 includes a display 10, a sliding member 20, and a main body 30. The display 10 is rotatably connected to the main body 30 by the sliding member 20. In the embodiment, the electronic device 1 is a notebook computer.

Two connecting members 11 protrude from an end of the display 10. The sliding member 20 includes a larger shaft 21 and two smaller shafts 22. One end of each smaller shaft 22 is fixedly received in the larger shaft 21, and the other end of each smaller shaft 22 is rotatably connected to one connecting member 11, thus a hinge (not labeled) is formed, and the display 10 can be rotated about the sliding member 20.

The main body 30 includes a housing 31, a first casing 32, and a second casing 33. The housing 31 is configured to accommodate electronic components, such as a motherboard. The housing 31 defines at least two slots 311 extending along the width of the housing 31 and extending into the housing 31 from one end of the housing 31. The slots 311 are spaced apart from each other and are parallel to each other. The distance between the slots 311 is substantially equal to the distance between the connecting members 11, and the width of each slot 311 is substantially equal to that of each connecting member 11. Each slot 311 defines an entrance hole 312 at an end of the housing 31. The connecting members 11 thus can respectively slide into the slots 311 through the entrance holes 312.

The first casing 32 is fixed to the housing 31, and is arranged on the housing 31. The first casing 32 and the housing 31 cooperatively form a first receiving space 34 to receive the sliding member 20. In this embodiment, the depth of the first receiving space 34 is slightly greater than the diameter of the larger shaft 21. The sliding member 20 thus can slide in the first receiving space 34. In this embodiment, the first casing 32 includes a keyboard for users input.

The second casing 33 is arranged below the housing 31, and one end of the second casing 33 is secured to another end of the housing 31. The second casing 33 and the housing 31 cooperatively form a second receiving space 35 to receive the display 10. The second receiving space 35 is communicated with the first receiving space 34 by the slots 311. The second receiving space 35 defines an opening 351 substantially perpendicular to the slots 311. The size of the second receiving space 35 is the same as the display 10. The display 10 can be pushed into the second receiving space 35 via the opening 351.

The electronic device 1 further includes two latching members 40 received in the first receiving space 34 and arranged adjacent to the opening 351. Each latching member 40 includes an elastic member 41 and a resisting member 42. One end of one elastic member 41 is secured to the first casing 32, and the opposite end is secured to one resisting member 42. One end of the other elastic member 41 is secured to the housing 31, and the opposite end is secured to the other resisting member 42. The distance between two resisting members 42 is less than the diameter of the larger shaft 21. When the display 10 is out of the second receiving space 35, the larger shaft 21 is clipped by the resisting members 42 due to the spring force of the elastic members 41 to cause the sliding member 20 to stay in a stable state.

Figure 6:
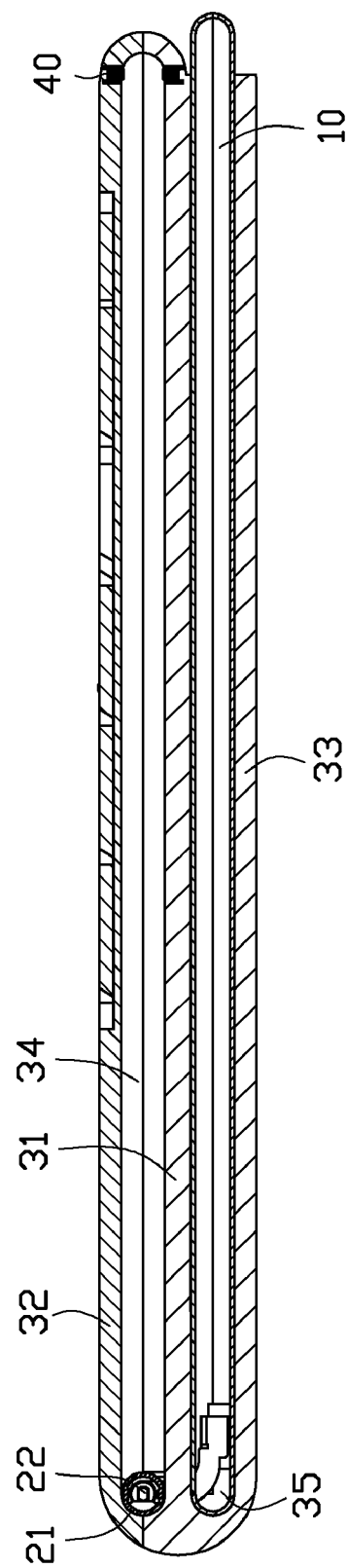
FIG. 6 is a cross-sectional view of the electronic device of FIG. 2, taken along line VI-VI.

Referring also to FIG. 6, to stow the display 10 in the second receiving space 35, the display 10 is rotated to be parallel to the second receiving space 35. At this point, the display 10 is pushed into the second receiving space 35, causing the connecting members 11 to slide in the sliding slots 311. Because the sliding member 20 is connected to the connecting members 11, the sliding of the connecting members 11 causes the larger shaft 21 to disengage from the resisting members 42 and causes the sliding member 20 to slide in the first receiving space 34. When the larger shaft 21 disengages from the resisting members 42, the elastic members 41 rebound. When the sliding member 20 is caused to move to a position away from the openings 312, the display 10 is fully received in the second receiving space 35.

Figure 7:
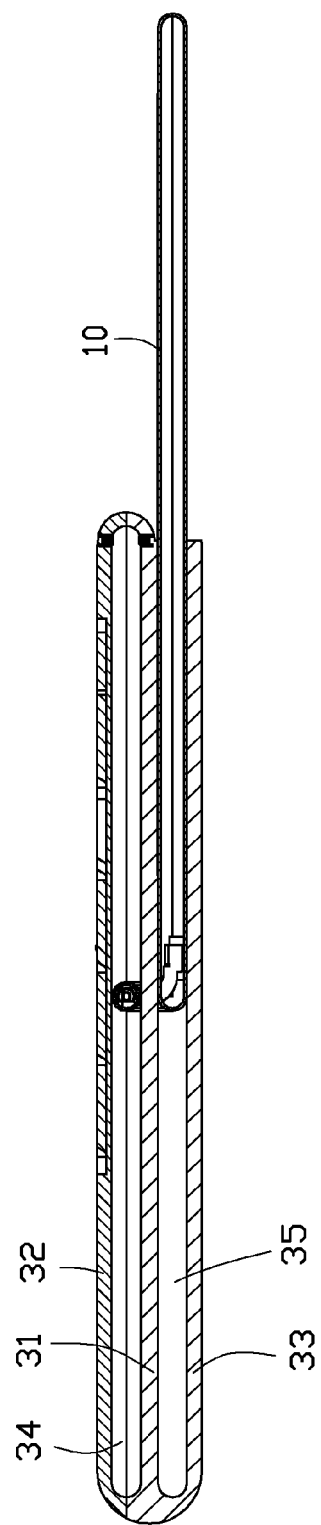
FIG. 7 is similar to FIG. 6, but showing the display partially pulled out of the compartment.

Referring also to FIG. 7, to pull out of the display 10, the display 10 is pulled towards the opening 351, causing the connecting members 11 to move in the slots 311 toward the entrance holes 312. The sliding of the connecting members 11 causes the sliding member 20 to move in the first receiving space 34 towards the entrance holes 312. When the display 10 is fully pulled out of the second receiving space 35, the sliding member 20 is moved to a position where the larger shaft 21 is clipped by the resisting members 42 due to the spring force of the elastic members 42. At this point, the display 10 can be rotated to desired position where it will stay until acted on by an outside force due to the friction between the connecting members 11 and the smaller shafts 22.

Although the present disclosure has been specifically described on the basis of the exemplary embodiment thereof, the disclosure is not to be construed as being limited thereto.

Various changes or modifications may be made to the embodiment without departing from the scope and spirit of the disclosure.

What is claimed is:

1. An electronic device, comprising:
   a display comprising two connecting members;
   a sliding member rotatably connecting to the connecting members; and
   a main body, comprising,
      a housing defining two slots, each of the slots extending through the housing from one end of the housing;
      a first casing secured to the housing, the first casing and the housing cooperatively defining a first receiving space communicating with the slots, the sliding member slidably received in the first receiving space; and
      a second casing secured to the housing, the second casing and the housing cooperatively defining a second receiving space to receive the display, the second receiving space communicating with the first receiving space and defining an opening, the display being pushed into and out of the second receiving space from the opening.

2. The electronic device as described in claim 1, further comprising two latching members arranged in the first receiving space to keep the sliding member in a stable position.

3. The electronic device as described in claim 2, wherein each of the latching members comprises an elastic member and a resisting member, one end of one of the elastic members is secured to the first casing, an opposite end of the one of the elastic members is secured to one of the resisting members, one end of the other one of the elastic members is secured to the housing, and an opposite end of the other one of the elastic members is secured to other one of the resisting members, when the sliding member is clipped by the resisting members due to the spring force of the elastic members, the sliding member stays in the stable position.

4. The electronic device as described in claim 1, wherein a width of each of the slots is equal to that of each of the connecting members, the distance between the slots is equal to that between the connecting members.

5. The electronic device as described in claim 1, wherein each of the slots defines an entrance holes, each of the connecting member slides into each of the slots through the entrance holes.

6. The electronic device as described in claim 1, wherein the first casing is arranged on the housing, and the second casing is arranged below the housing.

* * * * *